United States Patent [19]

Kreusel

[11] Patent Number: 4,817,897
[45] Date of Patent: Apr. 4, 1989

[54] CROSS-CONNECTOR TO TWO CROSSING TUBULAR ELEMENTS

[76] Inventor: Ulrich Kreusel, Birkenstrasse 28, 6537 Gensingen, Fed. Rep. of Germany

[21] Appl. No.: 11,584

[22] Filed: Feb. 6, 1987

[30] Foreign Application Priority Data

Feb. 13, 1986 [DE] Fed. Rep. of Germany ....... 3604325

[51] Int. Cl.$^4$ .............................................. F16L 3/16
[52] U.S. Cl. ................................... 248/68.1; 248/74.1; 403/385; 403/398
[58] Field of Search .............................. 248/74.1–74.5, 248/68.1, 69; 403/385, 398, 400, 389

[56] References Cited

U.S. PATENT DOCUMENTS

| | | | |
|---|---|---|---|
| 2,331,384 | 10/1943 | Flachowsky | 248/74.4 X |
| 2,466,717 | 4/1949 | Littell | 248/74 X |
| 3,065,981 | 11/1962 | Arrison | 403/385 |
| 4,602,760 | 7/1986 | Tiefenbach et al. | 248/74.3 X |

FOREIGN PATENT DOCUMENTS

| | | | |
|---|---|---|---|
| 925505 | 8/1974 | Canada | 248/74.1 |
| 2345843 | 3/1975 | Fed. Rep. of Germany | 248/68.1 |
| 7811000 | 5/1980 | Netherlands | 403/305 |

Primary Examiner—Alvin C. Chin-Shue
Attorney, Agent, or Firm—O'Neil and Bean

[57] ABSTRACT

The present invention relates to a cross connector for two continuous pipes that cross over each other at any desired angle, the connector comprising two pipe clamps that encircle the two pipes to be connected, and each of which has two clamp arms that have a gap between them. The object of the invention is characterized in that the pair of clamp arms (6) of one pipe clamp (1) is inserted at the front side into the pair of clamp arms (7) of the other pipe clamp (2) and held by means of a snap connection so as to be able to rotate freely; and in that the outer clamp arm pair (7) can be tightened securely against the inner clamp arm pair (6) by means of a tightening device.

8 Claims, 3 Drawing Sheets

CROSS-CONNECTOR TO TWO CROSSING TUBULAR ELEMENTS

The present invention relates to a cross-over connector for two continuous pipes that intersect at any angle. The connector has pipe clamps that encircle each of the pipes to be connected, each pipe clamp having two clamp arms that have a gap between them.

When a web-like structure is to be produced from pipe, connectors required are to connect the pipes that meet at the junction points. Such connectors, which join horizontal, vertical, and inclined pipes, are used in display structures, scaffolding, shelving, and the like. When used to connect two continuous pipes that cross over each other, such connectors consist of a pipe clamp that encircles each of the pipes to be joined, the interlocking clamp arms of these being tightened by a screw that passes through the clamp arms. However, a connector of this type only permits the connection of the pipes at a specific angle that results from the arrangement of the clamp arms on the pipe clamp.

Very frequently, however, it is necessary to join the pipes at varying angles. To this end, DE-OS No. 20 38 155 describes a strap coupling to join pipes that cross at any angle, this consisting of a pair of straps, each of which has a recess of semicircular outline, for each of the pipes that are to be connected. Pairs of straps that correspond in number to the number of pipes to be joined are superimposed and then connected to each other by means of a screw that passes through all the straps, the straps having an arc-like slot about a common pivot point, whereby the pairs of straps can be screwed together at any angle. This type of strap connector is relatively costly, since it requires four locking screws and, because of the curved slot that is formed in the straps to accommodate the screws it does not permit an infinitely variable pivoting of crossed-over pipes through a range of 360 degrees.

DE-OS No. 29 03 126 describes a cross member for connecting two continuous pipes that cross over each other, consisting of a lower strap with a bead in which the lower of the two pipes that cross over each other is placed, of an intermediate block between the upper and the lower pipe, with a groove on the underside and a groove on the upper side, and an upper strap that also has a groove, this covering the upper pipe, there being a hole for a screw, which passes through all three parts of the cross-over element, in each its three parts, said screw connecting all the parts of the cross-over element. The intermediate block between the pipes that cross over each other consists of two parts that lie directly above each other and can be rotated about a continuous hole for the screw. This means that the angle at which the pipes cross over each other can be varied continuously. A cross-over element of this type provides for a continuously variable pivoting connection; however, it is relatively costly because of the two-part intermediate block that is required.

It is the aim of the present invention to create a cross-over connector of the type described in the introduction hereto, this is simple to manipulate, consists of the smallest possible number of parts, and permits the rapid application of clamping force.

The invention provides a cross connector for two continuous pipes that cross over each other at any desired angle, said connector having a respective pipe clamp that encircles each pipe to be so connected, each pipe clamp comprising two clamp arms that have a space between them, characterized in that the clamp arm pair of one pipe clamp is insertable at the end face into the clamp arm pair of the other pipe clamp to be held therein by a snap connection so as to be able to pivot freely; and in that the outer clamp arm pair can be securely tightened to the inner clamp arm pair by fastener means.

Using such a cross connector it is possible to join two pipes very rapidly and easily. The pipe clamps that encircle the pipes to be connected are simply snapped together by their pairs of clamp arms and then rotated into the desired position; all that is then required is to tighten the fastener that is associated with the outermost pair of clamp arms so as to effect a reliable clamped connection between the pairs of clamp arms of the pipe clamp, which means that the pipes are securely held in the position in which they have been placed.

In an advantageous embodiment of the invention there are detent stops of semi-circular shape at the free ends of the arms of the innermost pair of clamp arms, and these engage in an corresponding groove that runs around the inner side of the arms of the outermost pair of clamp arms. This ensures that the pipe clamp that has been snapped into position can be rotated freely and very easily about its axis through 360 degrees. It is preferred that the detents of the innermost pair of clamp arms be of conical cross-section and provided with an undercut that engages behind a step of a similarly conically formed groove of the outermost of clamp arms.

In order to increase the pressure surface between the pairs of clamp arms, in a further development the outer side of the innermost pair of clamp arms extends from the undercut of the detents parallel to the conical outer side of the detents, and in the end face of the outer clamp arm pair there is a corresponding conically formed insertion opening that extends into the groove.

In order to provide for simple production in a molding process used for the pipe clamp, it is expedient that the circular groove in the inner side of the arms of the outer pair of clamp arms be formed in conjunction with a continuous transverse opening of trapezoidal cross-section that extends at right angles to and centrally in the gap between the clamp arms. In the process of molding the clamp arms the mold slide is passed through this opening to produce the groove in the clamp arm pair.

In a further advantageous embodiment of the present invention the fastener that is associated with the outermost pair of clamp arms is an hexagonal socket set screw, the head of which rests in a countersunk hole in one arm, the threaded stem of which engages in a threaded hole in the other arm after passing. The fastener is thus fully integrated into the cross connector.

In order to achieve a gradual transition between the pipes and the pipe clamp that encircles them it is expedient that the parts of each pipe clamp that encircle the pipe be convexly rounded on the outside. It is preferred that both pipe clamps be of aluminum.

The underlying concept of the present invention will be described in greater detail below, on the basis of an exemplary embodiment that is shown in the drawings appended hereto, wherein.

Figure 1:
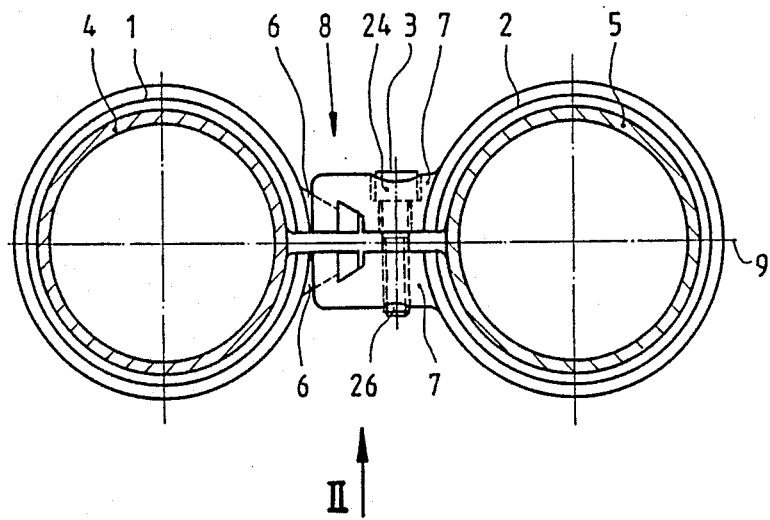
FIG. 1 is an elevational view of a cross connector according to the invention.
Figure 2:
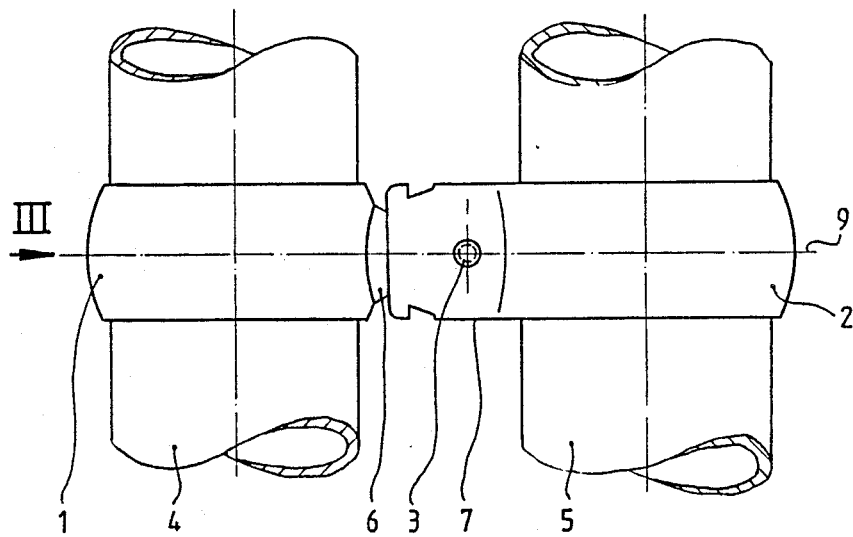
FIG. 2 is a plan view of a cross connector as in FIG. 1; in the direction indicated by the arrow II.
Figure 3:
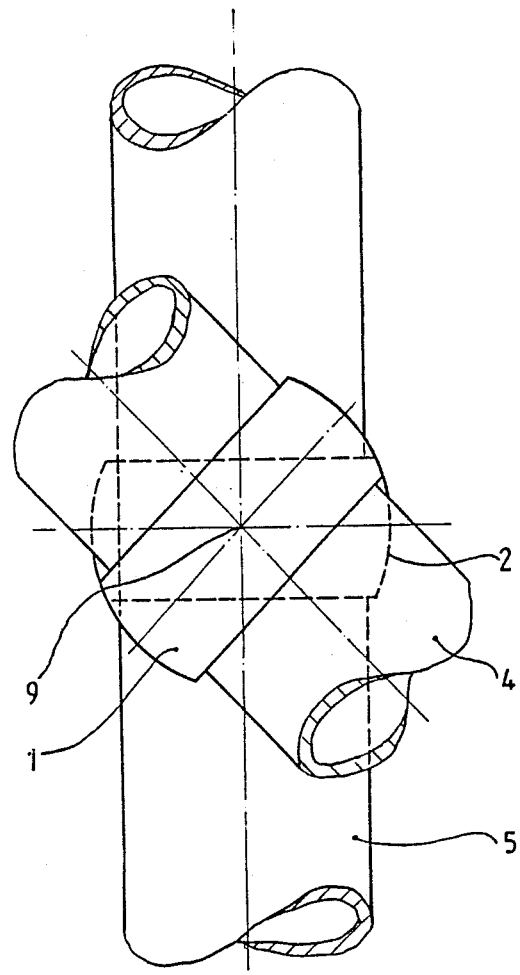
FIG. 3 is a view of the cross connector as seen in the direction indicated by the arrow III, when rotated.
Figure 4:
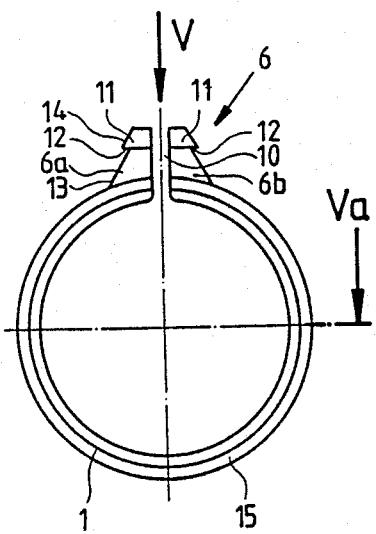
FIG. 4 is a detail view of the left-hand pipe clamp of the cross connector of FIG. 1.
Figure 6:
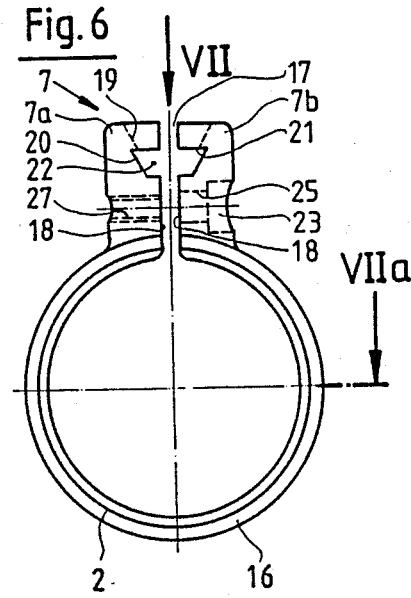
FIG. 6 is a detail of the right-hand pipe clamp of the cross connector of FIG. 1.
Figure 5:
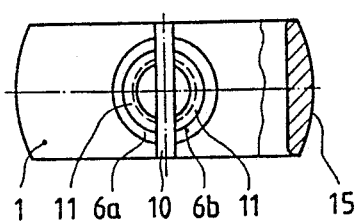
FIG. 5 is a view of the pipe clamp of FIG. 4, in the direction indicated by the arrow V, and in partial section in the direction indicated by the arrow Va.

The cross connector comprises the two pipe clamps 1 and 2 and the hexagonal socket set screw 3. The pipe clamp 1 encircles the continuous pipe 4, whereas the pipe clamp 2 encircles the continuous pipe 5. The clamp arm pair 6 is held in the clamp arm pair 7 by a snap connection 8. The snap connection 8 is configured so that when the hexagonal socket set screw, which serves as the tightening screw and is inserted in the outermost pair of clamp arms 7, is not tightened, the pipe clamps 1 and 2 and the pipes 4 and 5 that they enclose can be freely rotated about the axis 9 through 360 degrees, and can thus be set at any desired angle relative to each other. It is possible to provide a reliable, force-locking connection between the pipes 4, 5 and the cross connector by tightening the hexagon socket set screw 3 when the pipes 4, 5 are in the desired position. At their free ends, each of the arms 6a, 6b of the clamp arms 6 of the pipe clamp 1, which have a gap 10 between them, has a semicircular detent 11, the flat side of which extends in the plane of the gap 10. The detents 11, which are in their common cross-section trapezoidal (see FIG. 4) have a circular undercut 12 on the side that is proximate to the pipe clamp 1, whereas the outer side 13 of the arm 6a, 6b of the clamp arm pair 6 is offset and extends parallel to the conical outer side 14 of the detent 11, i.e., both the arms 6a and 6b as well as the detent form in each instance a truncated cone. That portion of the pipe clamp 1 that split ring encircles the pipe 4 is rounded on the outside as shown at 15 in FIG. 5 to even out the transition from the pipe 4 to the pipe clamp 1.

Figure 7:
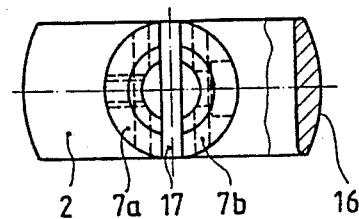
FIG. 7 is a view of the pipe clamp of FIG. 6, in the direction indicated by the arrow VII, and in partial cross-section in the direction indicated by the arrow VIIa.

The pipe clamp 2 is also rounded off on the outside 6 (FIG. 7) on that split ring portion that encloses the pipe 5. The arms 7a, 7b of the clamp arm 7 of pipe clamp 2, which have a gap between them, are of semicircular cross-section, with the flat inner sides 18 of the arms 7a, 7b forming the defining walls of the gap 17. There is a conical insertion opening 19 let into the end face of the clamp arm pair 7, and the side walls of this correspond to the outer sides 13 of the arms 6a, 6b of the clamp arm pair 6 of the pipe clamp 1. A semicircular groove 20 that is formed in the inner sides 18 of the arms 7a, 7b adjoins the insertion opening 19 of the clamp arm pair 7, and the dimension of this groove are such that it can accommodate the detents 11 of the clamp arm pair 6 of pipe clamp 1, with the undercut 12 of the detents 11 abutting against a step 21 formed between the insertion opening 19 and the groove 20. The groove 20, which is of conical cross-section, is formed in conjunction with a through opening 22 that is parallel to the end face of the clamp arm pair 7 and of a cross-section corresponding to the groove 20, this opening 22 being central in the gap 17. The opening 22 is used for the introduction of the mold slide when the groove is being produced in the molding process. Beneath the opening 22 there is in the arm 7b a countersunk bore to receive the head 24 of the hexagonal socket set screw 3. In the arm 7b there is a through bore 25 to receive the threaded stem 26 of the hexagonal socket set screw 3. Opposite the bore 25, in the arm 7a there is a threaded bore 27 into which the threaded shaft 26 of the hexagonal socket set screw 3 can be engaged.

In order to connect the two pipe clamps 1 and 2, the prestressed split ring clamp 1 is compressed to move the detents 11 as close together as possible. The detents 11 are then inserted through the opening 19 into the groove 20 of the split ring pipe clamp 2 and snapped into place, whereupon, because the pipe clamp 2 is is pretensioned, the step 21 of the groove 20 snaps into the undercut 12 in the detent 11 of the pipe clamp. Thus, a swivelling connection is formed between the two pipe clamps 1, 2. The hexagonal socket set screw 3 is then screwed through the set screw recess 23 into the threaded hole 27. The pipes 4, 5 are then pushed through the pipe clamps 1, 2. The pipes 4, 5 can, however, be introduced into the pipe clamps 1, 2 prior to the production of the swivelling connection. Next, the pipes 4, 5 with the associated pipe clamps 1,2 are rotated into the desired position, and the hexagonal socket set screw 3 is tightened to establish a tight clamp connection on the one hand between the outer clamp ar pair 7 of the pipe clamp 2 and the inner clamp arm pair 6 of the pipe clamp 1, and on the other hand between the pipes 4, 5 and the associated pipe clamps 1, 2.

The pipe clamps 1, 2 are of aluminum, which has the advantage that it is rust-free. As a consequence, one can also use a non-rusting material for the hexagonal socket set screw 3 and an optional safety element (not shown herein). It is clear that this cross connector can be installed very rapidly, and can be dismantled just as quickly. It is simple and inexpensive to produce, entails low expenditures of material, and is of pleasing appearance. The universally usable cross connector is suitable for use in exhibition structures, scaffolding, and the like.

The above detailed description of the drawings demonstrates the particularly simple and practical design of the cross connector according to the present invention which, without prejudice to its simplicity, is extremely reliable. Even though the description is based on only one embodiment, there are many possibilities for modification of the solution according to the present invention, which will be apparent to the expert, which will be apparent from the above, within the context of the arrangement that is claimed.

I claim:

1. A cross connector for connecting two continuous pipes that cross each other at any desired angle, said cross connector including a first and a second pipe clamp each having a split ring pipe encircling portion for encircling a pipe to be clamped, an inner pair of outwardly extending clamp arms formed one adjacent each end of the split ring of said first pipe clamp and an outer pair of outwardly extending clamp arms formed one adjacent each end of the split ring of said second pipe clamp, the clamp arms of each pair having a space therebetween, detent means formed on the outer surface of said inner pair of clamp arms and groove means formed in the spaced inner surfaces of the outer pair of clamp arms, said inner pair clamp arms being insertable between said outer clamp arm to engage said detent means with said groove means by a snap connection permitting free rotation between the first and second pipe clamps, and screw fastener means extending between and engaging said outer clamp arms, said screw fastener means being operable to securely clamp said outer clamp arms to said inner clamp arms to thereby tighten each clamp and securely connect the pair of pipes.

2. A cross connector as defined in claim 1 characterized in that said detent means comprises semicircular detents at the free ends of the arms of said inner pair of clamp arms and said groove means comprises complimentary circular grooves in the inner surfaces of the arms of the outer pair of clamp arms.

3. A cross connector as in claim 2, characterized in that the detents of the inner clamp arm pair are configured so as to be of conical cross-section and provided with an undercut that engages behind a step in the similarly conical groove of the outer clamp arm pair.

4. A cross connector as in claim 2, characterized in that the outer sides of the inner clamp arm pair extends from the undercut of the detents parallel to the conical outer side of the detents; and in that a similarly conically formed insertion opening that extends as far as the groove is provided in the end face side of the outer clamp arm pair.

5. A cross connector as in claim 4, characterized in that the circular groove in the inner side of the arms of the outer clamp arm pair is aligned with a continuous transverse opening of trapezoidal cross-section that extends at right angles to and centrally in the gap between the arms.

6. A cross connector as in claim 1, 2 or 3, characterized in that the fastener means is a set screw, the head of which rests in a countersunk bore in one arm, the threaded stem of which engages in a threaded hole in the other arm.

7. A cross connector as in claim 1, 2 or 3, characterized in that the portion of each pipe clamp that surrounds the pipe is convexly rounded on the outside.

8. A cross connector as in claim 1, 2 or 3, characterized in that the two pipe clamps are of aluminum.

* * * * *